Jan. 3, 1928.
G. O. LEE
1,655,376
DRAWBAR ATTACHMENT FOR TRACTORS
Filed Dec. 1, 1926  2 Sheets-Sheet 2
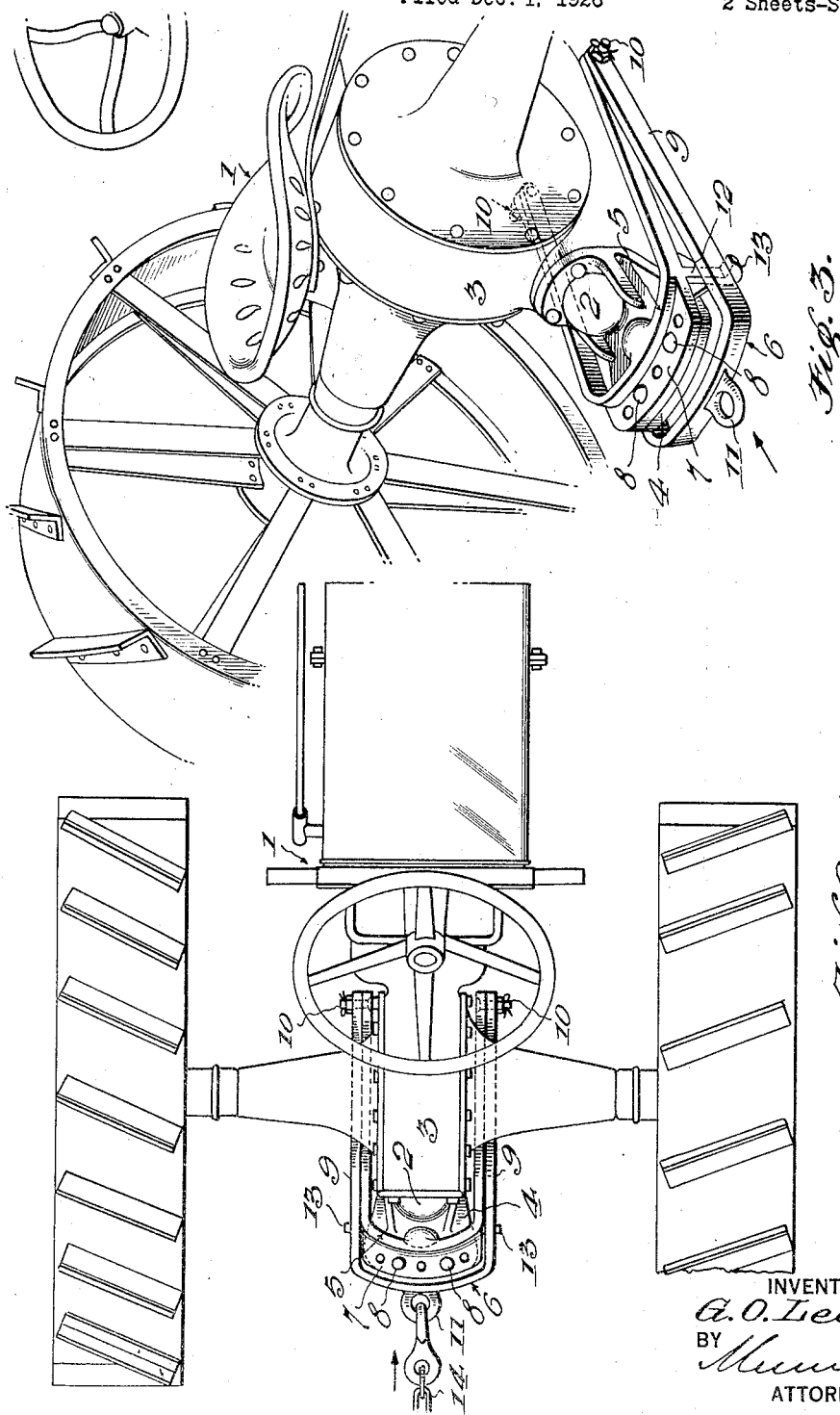
INVENTOR
G. O. Lee
BY
ATTORNEYS Patented Jan. 3, 1928.

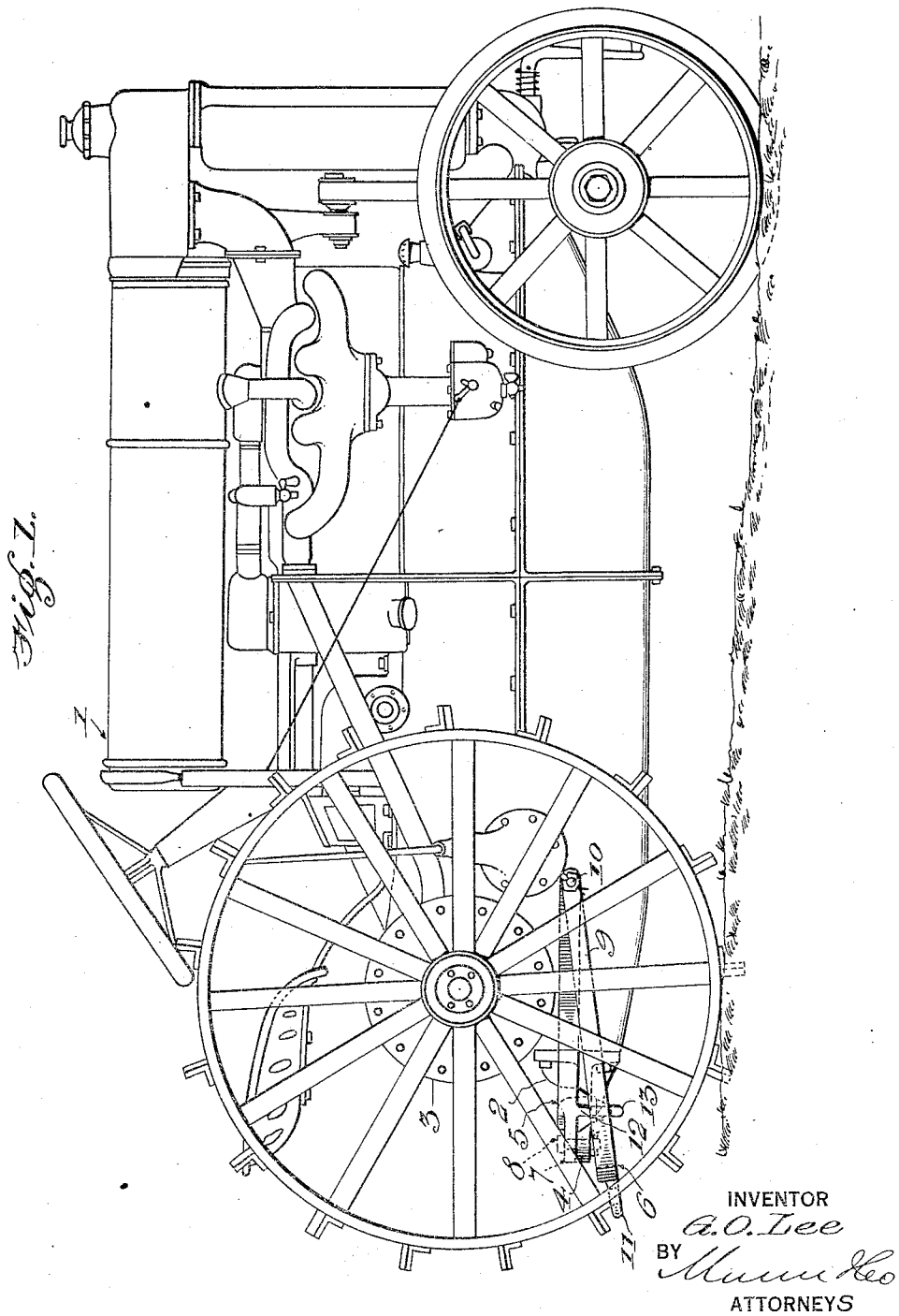

1,655,376

UNITED STATES PATENT OFFICE.

GARNETT O. LEE, OF LYNCHBURG, VIRGINIA.

DRAWBAR ATTACHMENT FOR TRACTORS.

Application filed December 1, 1926. Serial No. 152,036.

My invention relates to improvements in draw bar attachments for tractors, and it consists in the combinations, constructions and arrangements herein described and claimed.

An object of the invention is the provision of a draw bar attachment for a tractor of a well known type of construction which will tend to prevent the rising of the front end of the tractor when a relatively heavy load is being drawn or when the tractor is ascending a relatively steep grade and as frequently occurs when the tractor is equipped with its usual draw bar only.

A further object of the invention is the provision of an attachment of the character described which can be applied to the draw bar cap of a tractor of the type referred to without any alteration of the draw bar cap and without the exercise of any unusual skill or the use of any special tools or fastening means.

Other objects and advantages of the invention will be apparent from the following description, considered in conjunction with the accompanying drawings, in which—

Figure 1 is a side elevation of a tractor equipped with a draw bar attachment embodying the invention, Figure 2 is a partial plan view of the tractor, showing the rear end portion of the tractor with the improved draw bar attachment applied thereto, and Figure 3 is a fragmentary perspective view of the rear end portion of the tractor with the improved draw bar attachment applied thereto.

In the drawings, the numeral 1 generally designates a tractor of a well known type of construction. This tractor is supplied with the usual draw bar cap 2 which is secured to the rear axle housing 3, as is usual.

The draw bar cap 2 includes the usual rearwardly extending flat plate portion indicated at 4 forming the draw bar of the tractor to which a vehicle or other load to be drawn by the tractor ordinarily is secured. When the load is relatively heavy, the front end of the tractor may rise when the load is secured to this draw bar since the resistance that is opposed to the forward movement of the tractor then tends to swing the front end of the tractor upwardly about the axis of the rear axle of the tractor. To obviate this objectionable feature, the present invention proposes to provide an attachment for the draw bar which will serve as a connection between the tractor draw bar and the tongue or other pull member of the load that is to be drawn with the point of application of the load on the tractor located in advance of or at least not at the rear of the rear axle of the tractor. To this end, an attachment embodying the invention may comprise two substantially U-shaped nested sections 5 and 6, respectively. The web of the section or yokes 5 has an integral flat attaching plate extension 7 at its outer side adapted to lie flatwise on the plate portion 4 of the draw bar cap 2 and to be secured and rigidly anchored to the latter by bolts 8 or like fastening devices so that the arms of the section 5 will extend forwardly at opposite sides of the draw bar cap 2 and underneath the rear axle housing 3 a substantial distance in advance of the axial line of the rear axle of the tractor. The outer embracing section 6 is of slightly greater length and width than the inner section 5 and the arms 9 of the outer section 6 are adapted to straddle the section 5 and to be suitably connected at their forward ends to the forward end portions of the arms of the section 5 by the alined transverse pivot elements 10, the length of the outer yoke 6 being such, preferably, that its web is located slightly at the rear of the rear edges of the members 4 and 7. With the arrangement just described, the section 6 is mounted to swing vertically about the axial line of the pivot elements 10 with its rear end forming an auxiliary draw bar. The web of the section 6 is provided with a rearwardly extending attaching eye 11 which is located intermediate the length of the web portion of the section 6 and at the outer or rearward side of the web.

The downward swinging movement of the outer yoke section 6 about the axial line of the pivot elements 10 relatively to the plane of the section 5 is limited by suitable means which may comprise a pair of depending integral supporting arms 12 which are located at opposite ends of the web portion of the section 5 between the arms 9 of the section 6 and are formed with out turned supporting lugs 13 at their lower ends on which the arms 9 of the section 6 will rest when the section 6 is at the limit of its downward swinging movement about the axial line of the pivot elements 10, as shown in the drawings, whereby the section 6 will be prevented from swinging downward into contact with the earth when the tractor is not employed to drag or pull a load.

From the foregoing description of the various parts of the device, the operation thereof may be readily understood. The portion 11 of the section 6 of the attachment is adapted for connection with a pull chain, such as partially shown at 14 in Figure 2, or with any other suitable draft member for connecting the section 6 of the attachment with a load that is to be drawn or actuated by the tractor. The attachment, therefore, is effective to transfer the point of draw bar pull forwardly of the axis of the tractor rear axle, utilizing the tractor draw bar itself as an anchorage for the rear end of the mount for auxiliary draw bar. The resistance that the load will offer to forward movement of the tractor will be imparted to the section 5 of the attachment along the axial line of the pivot elements 10 and since the section 5 of the attachment is anchored to and rigid with the draw bar cap 2 and the frame of the tractor, and the axial line of the pivot elements 10 is located in advance of the axis of the rear axle of the tractor, it is obvious that such resistance, however great, will not cause the front end of the tractor to swing upwardly about the axial line of the rear axle of the tractor. On the contrary, the resistance that is offered by the load to the forward movement of the tractor will tend to prevent the rising of the front end of the tractor when the load is relatively heavy or when the tractor is ascending a relatively steep grade.

The attachment can be readily applied to or removed from the usual draw bar cap of a tractor.

Obviously, the invention is susceptible of embodiment in forms other than that which is illustrated in the accompanying drawings, and I therefore consider as my own all such modifications and adaptations thereof as fairly fall within the scope of the appended claims.

I claim:

1. The combination with a tractor having a rearwardly extending draw bar at the rear side of the rear axle of the tractor, of an attachment comprising a substantially U-shaped supporting section having its web portion anchored to said draw bar and having its arms extending forwardly therefrom in straddling relation to said draw bar and terminating forwardly of the axis of the rear axle on the tractor, and a second substantially U-shaped draft section having forwardly extending arms straddling said supporting section and pivotally connected adjacent their forward ends with the arms of the anchored supporting section in advance of the axial line of the rear axle of the tractor, the web at the rear of said draft section being adapted for connection with a load that is to be drawn or actuated on forward movement of the tractor.

2. The combination with a tractor having a rearwardly extending draw bar at the rear side of the rear axle of the tractor, of an attachment comprising a substantially U-shaped supporting section having its web portion anchored to said draw bar and having its arms extending forwardly therefrom in straddling relation to said draw bar and terminating forwardly of the rear axle on the tractor, and a second substantially U-shaped draft section having forwardly extending arms straddling said first named section and pivotally connected with the arms of the first rigid section in advance of the axial line of the rear axle of the tractor, the web at the rear of said draft section being adapted for connection with a load that is to be drawn or actuated on forward movement of the tractor, and means for limiting the downward swinging movement of said draft section relatively to said first named rigid section.

3. The combination with a tractor having a rearwardly extending draw bar at the rear side of the rear axle of the tractor, of an attachment comprising a substantially U-shapped supporting section having its web portion anchored to said draw bar and having its arms extending forwardly therefrom in straddling relation to said draw bar terminating forwardly of the rear axle on the tractor, and a second substantially U-shaped draft section having forwardly extending arms straddling said first named section and pivotally connected with the arms of supporting section in advance of the axial line of the rear axle of the tractor, the web at the rear of said draft section being adapted for connection with a load that is to be drawn or actuated on forward movement of the tractor, said supporting section having a pair of depending arms at the inner sides of the arms of the draft section, said depending arms having out turned members at their lower ends for supporting the arms of the second rigid section above the surface on which the tractor is supported.

4. An attachment for a tractor having a draw bar at its rearward end extending rearwardly of the rear axle of the tractor, said attachment comprising a substantially U-shaped supporting section having a substantially flat attaching extension at the outer side of its web adapted to be anchored to the draw bar of the tractor so that the arms of said section will extend forwardly therefrom in straddling relation to said draw bar and underneath the rear axle of the tractor to a point in advance of its axis, and a draft substantially U-shaped section having forwardly extending arms adapted to straddle the arms of said first named section, with alined pivot elements connecting adjacent arms of the two sections along a line not rearward of the axial line of the rear axle of the tractor, the web at the rear end of said draft section having a rearwardly extending apertured attaching member at the rear side of its middle portion.

5. An attachment for a tractor having a draw bar at its rearward end extending rearwardly of the rear axle of the tractor, said attachment comprising a substantially U-shaped supporting section having a substantially flat attaching extension at the outer side of its web adapted to be anchored to the draw bar of the tractor so that the arms of said section will extend forwardly therefrom in straddling relation to said draw bar and terminating forwardly of the axis of the rear axle of the tractor, and a second substantially U-shaped draft section having forwardly extending arms adapted to straddle the arms of said supporting section, alined pivot elements connecting adjacent arms of the two sections along a line not rearward of the axial line of the rear axle of the tractor, the web of said second rigid section having a rearwardly extending apertured attaching member at the rear side of its middle portion, and means for limiting the downward swinging movement of the draft section relatively to its supporting section.

6. An attachment for the draw bar of a tractor comprising a supporting section adapted to be anchored at its rear end to the tractor draw bar and to extend forwardly therefrom beyond the axis of the rear axle of the tractor, and an axle and draft section connected at its forward end with the free forward end of said supporting section and with its rear end adapted for connection with a load to be drawn or actuated on movement of the tractor.

7. An attachment for the draw bar of a tractor comprising a supporting section adapted to be anchored at its rear end to said draw bar with its forward portion extending forwardly beyond the axis of the rear axle of the tractor, and a draft section pivotally mounted thereon substantially at its forward extremity and extending rearwardly therefrom to a point in rear of said axle axis for connection with a load that is to be drawn or actuated on movement of the tractor.

8. A tractor draw-bar attachment comprising a pair of nesting yoke members with the closed end of the inner yoke member anchored to the tractor draw bar and its open end extended forwardly to a point in advance of the axis of the rear axle of the tractor, the open end of the outer yoke member being pivotally mounted upon said forward ends of the inner yoke.

9. A tractor draw bar attachment comprising an anchor bar fixedly secured at its rear end to the tractor draw bar and having its forward end positioned and rigidly supported forwardly of the axis of the tractor rear axle, and an auxiliary draw bar having its forward end pivotally mounted on the forward end of said anchor bar and its rear end positioned rearwardly of said axle axis and formed for attachment thereto of the pull member of load to be drawn.

10. A tractor draw bar attachment comprising a pair of nested substantially U-shaped yoke members, the inner of which is anchored at its closed rear end to the tractor draw bar plate with its sides embracing the draw bar and extended forwardly to terminate forwardly of the axis of the tractor rear axle, the outer yoke member having its forward ends embracing and pivotally mounted to the forward ends of the inner anchor yoke and having its rear end extended rearwardly of said axle axis and formed for attachment thereto of the pull member of the load to be drawn.

GARNETT O. LEE.